3 Sheets--Sheet 1.

J. E. STEVENSON.

Water-Wheels.

No. 5,341. Reissued March 25, 1873.

*Witnesses.*
Fred Haynes
R. Rahm

J. E. Stevenson

AM. PHOTO-LITHOGRAPHIC CO. N.Y. (OSBORNE'S PROCESS.)

3 Sheets--Sheet 2.

J. E. STEVENSON.
Water-Wheels.

No. 5,341.

Reissued March 25, 1873.

*Witnesses.*
Jno. Haynes
R. Rabenu

J. E. Stevenson

AM. PHOTO-LITHOGRAPHIC CO. N.Y. (OSBORNE'S PROCESS.)

3 Sheets--Sheet 3.
J. E. STEVENSON.
Water-Wheels.
No. 5,341. Reissued March 25, 1873.
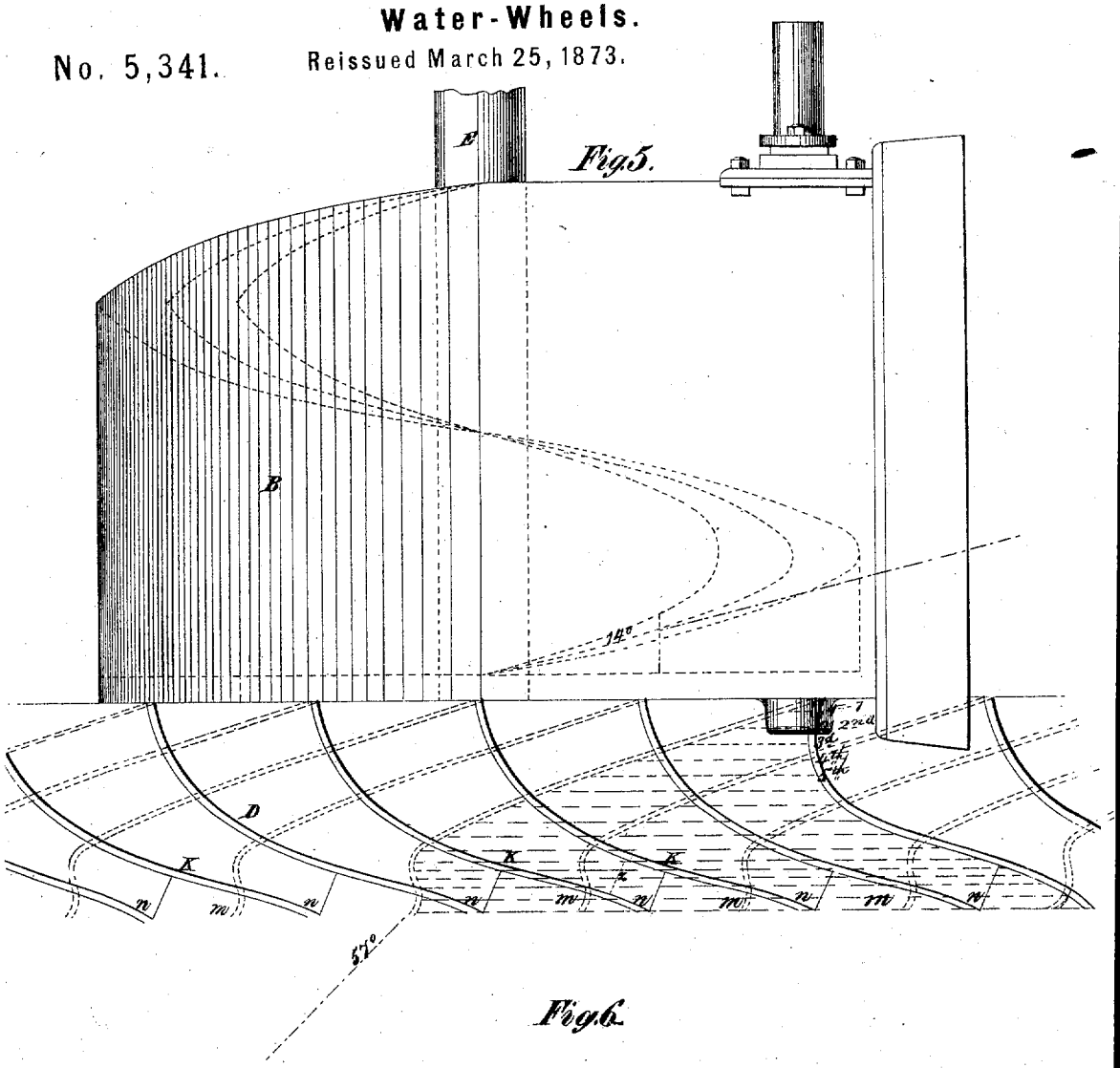
Fig. 6.
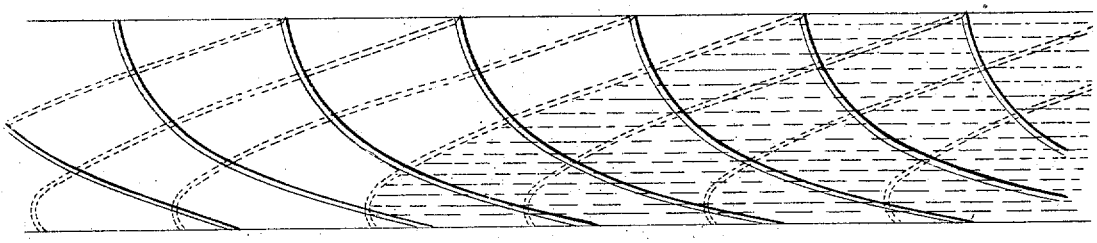
Witnesses.
Fred Haynes
R. Rabeau
J. E. Stevenson
AM. PHOTO-LITHOGRAPHIC CO. N.Y. (OSBORNE'S PROCESS.)

UNITED STATES PATENT OFFICE.

JAMES E. STEVENSON, OF NEW YORK, N. Y.

IMPROVEMENT IN WATER-WHEELS.

Specification forming part of Letters Patent No. 48,737, dated July 11, 1865; reissue No. 5,341, dated March 25, 1873.

*To all whom it may concern:*

Be it known that I, JAMES E. STEVENSON, of the city, county, and State of New York, have invented a new and Improved Water-Wheel; and I do hereby declare that the following is a full, clear, and exact description thereof, which will enable others skilled in the art to make and use the same, reference being had to the accompanying drawing forming part of this specification, in which—

Figure 1:
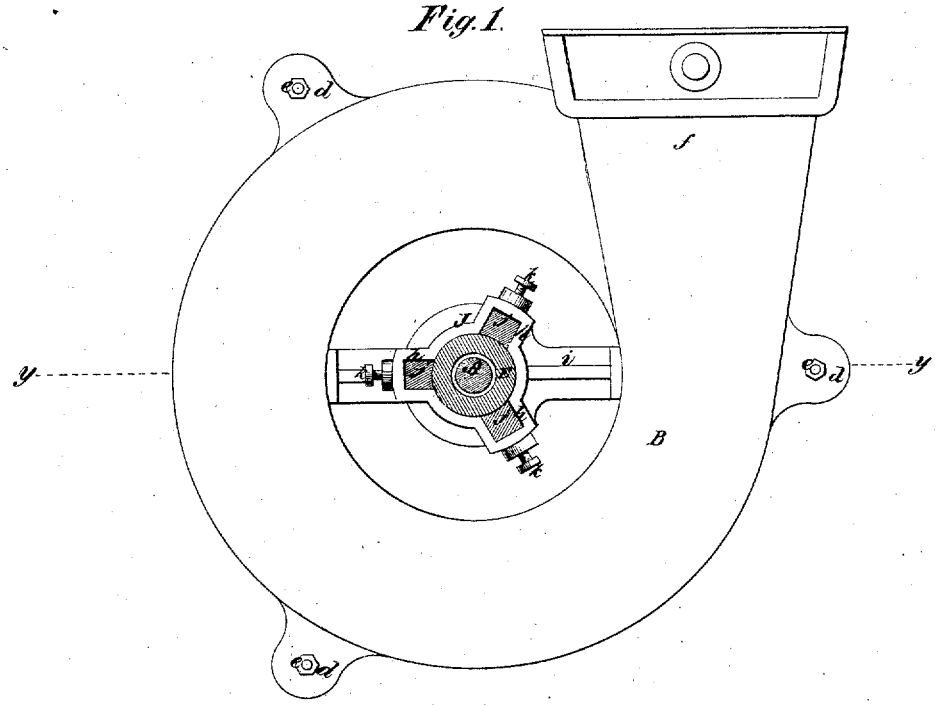
Figure 2:
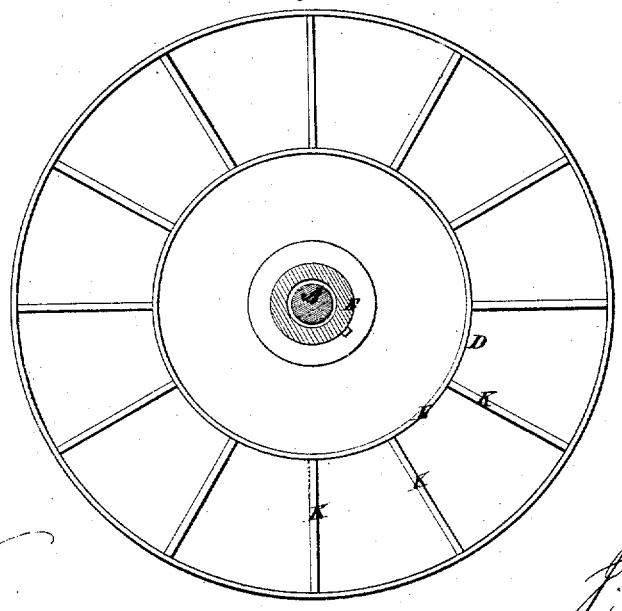
Figure 4:
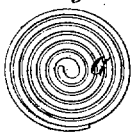
Figure 3:
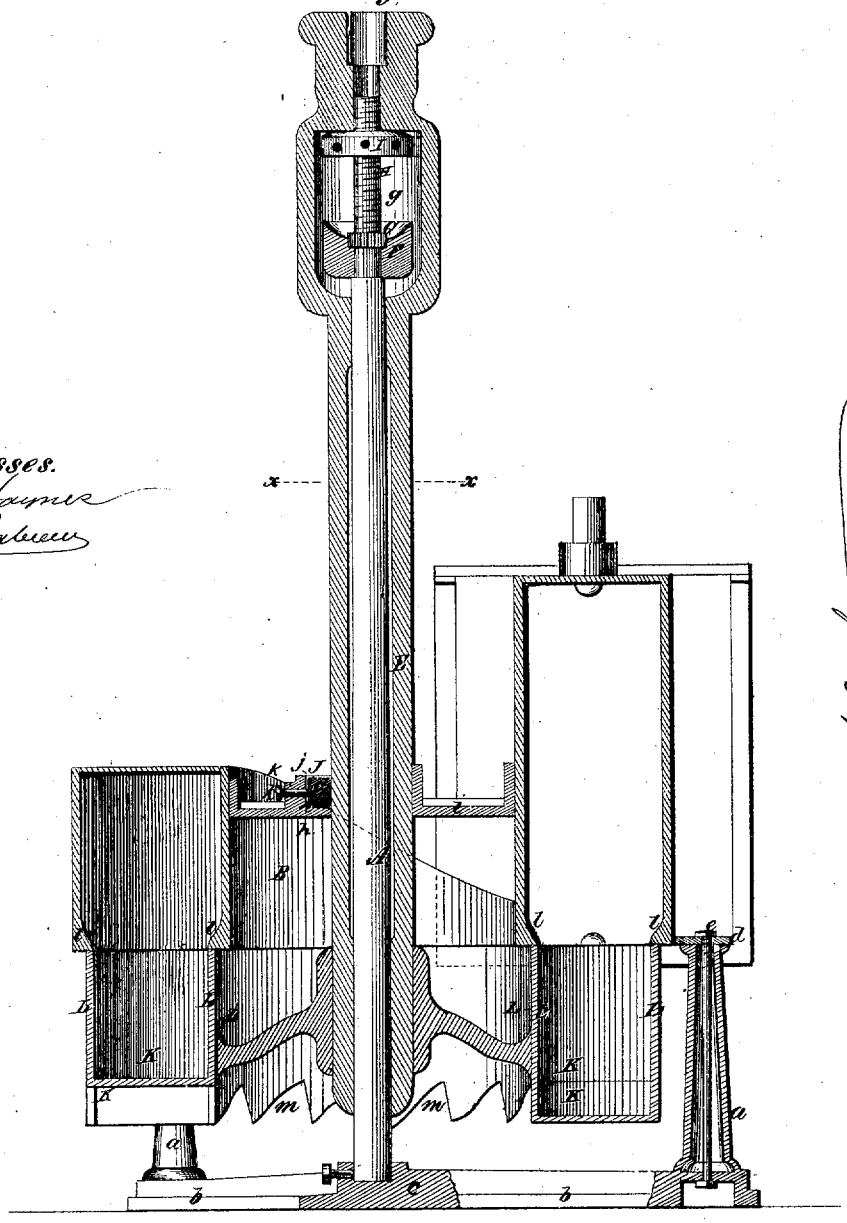

Figure 1 is a plan or top view of the wheel and helix, the tubular shaft and spindle being in section, as indicated by the line *x x*, Fig. 3. Fig. 2 is a detached plan or top view of the wheel. Fig. 3 is a vertical section of the wheel, helix, and shaft, taken in the line *y y*, Fig. 1. Fig. 4, a detached and enlarged plan or top view of an improved step pertaining to my invention. Fig. 5 is a diagram of the wheel, the buckets being developed on a plane for the purpose of showing the passage of the water through the wheel. Fig. 6, a diagram of an ordinary wheel of the same class drawn on the same plan, for the purpose of showing the difference between my improved wheel and one of the ordinary construction.

Similar letters of reference indicate like parts.

This invention relates to horizontal water-wheels of the turbine description; and consists in a novel construction of the buckets of the wheel, whereby an improved and economical effect is produced.

The framing of the wheel may be composed of uprights *a*, secured at their lower ends to radial bars *b* having a central hub, *c*, in which the lower end of a fixed upright spindle, A, is secured, as shown in Fig. 1. B represents the helix, which is supported by the uprights *a*, said helix being provided with lips *d* at its lower edge, which are secured by bolts *e* to the uprights. This helix is generally of circular form in its horizontal section with a portion at the end which receives the water formed tangential, as shown at *f* in Fig. 1, and of flaring form laterally. Said helix, in its vertical section, is of spiral form, gradually decreasing in depth from its outer end or orifice to its inner end, as will be understood by referring to Fig. 3. The helix at its orifice is provided with a gate, which is hung on a vertical axis. D represents the wheel which is attached or keyed to a tubular shaft, E, in which the fixed spindle A is fitted loosely, so that the former may turn freely on or around the latter. The tubular shaft E, near its upper end, is enlarged, to form a chamber, *g*, to receive a socket, F, which is on the upper end of the spindle A, and in which a step, G, is placed to serve as a rest or bearing for the lower end of a screw, H, the upper part of which is connected with the tubular shaft E, by means of a feather and groove, so as to cause the screw to turn with the tubular shaft and admit of the latter being raised and lowered without communicating said movement to the screw. The screw H has a nut, I, upon it, on which the upper end of the chamber *g* rests, and by which the weight of the wheel and tubular shaft is transmitted to the screw H and step G, and it will be seen that by turning the nut I the tubular shaft E and wheel D may be raised or lowered and adjusted vertically, as desired, so as to keep the upper edge of the wheel as close to the bottom or lower edge of the helix as may be without causing undue friction. (See Fig. 3.) The tubular shaft E is retained in a vertical position by means of a bearing, J, which is composed of three radial chambers, *h*, on a bar, *i*, which extends across the opening at the center of the helix, said chambers being provided with wooden keys, *j*, which are regulated by set-screws *k*, as shown clearly in Fig. 1. The buckets K of the wheel are between rims L L, the lower parts of which do not extend down to a common level with the lower ends or issues of the buckets, but are notched or have recesses, so that the lower parts of the buckets—say a distance of about one-third of their length—are fully exposed at each side, as shown by *m* in Figs. 3 and 5. By this means a free lateral discharge is allowed the water as it leaves the issues of the buckets. It is not obstructed, hemmed in, or confined in the least, as is the case with the ordinary wheels, or those which have their rims extending down to a level with the issues of the buckets all around the wheel. The buckets K are of spiral form, and are constructed with diverging tail or discharging ends, which may be done by curving the lower ends of the buckets slightly downward, as shown at *n* in Fig. 5, so as to give to the discharging ends or issues of the buckets an area which increases from the impinging line or point *z* toward the point of discharge.

This enlargement in area of the tail ends of the buckets in an outwardly direction, although it may seem trivial at first, is attended with the most important result. Thus, it is well known by experiments made with working wheels, that the angle that the water forms with the bottom of the wheel, in leaving it, depends on the velocity of the wheel. For instance, if the wheel be stationary the water will be discharged at an angle of about fifteen degrees with the horizontal line. If the wheel is running up to the velocity of the water the latter will be discharged in a direction coinciding with the direction the wheel is turning, and at the same angle that the water enters the wheel—say, fourteen degrees—and if the wheel is running at its working velocity, or seventy-two per cent. of the velocity of the water, the angle of discharge is found to be about fifty-seven degrees to the horizontal line in the direction the wheel is running.

In consequence of the diverging construction of the tails or lower ends of the buckets, as herein described, the discharge of the water is facilitated by giving or allowing it its natural direction on or a little before leaving the wheel, thereby reducing friction and producing a greater percentage of discharge by increasing the velocity, on the principle of water discharging through conically-divergent tubes producing a greater ratio of useful effect, and also giving a greater power to the same sized wheel over the old form of bucket, shown in Fig. 6.

What I claim as new, and desire to secure by Letters Patent, is—

The combination, with a turbine wheel, of buckets, the tail ends of which have an area increasing from the impinging-point toward the point of discharge, substantially as herein set forth.

J. E. STEVENSON.

Witnesses:
FRED. HAYNES,
R. E. RABEAU.